US008861637B2

(12) United States Patent
Na et al.

(10) Patent No.: US 8,861,637 B2
(45) Date of Patent: Oct. 14, 2014

(54) PRE-CODING METHOD, PRE-DECODING METHOD, TRANSMITTER AND MOBILE TERMINAL BASED ON INTERFERENCE ALIGNMENT

(75) Inventors: Chongning Na, Beijing (CN); Xiaolin Hou, Beijing (CN); Atsushi Harada, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 160 days.

(21) Appl. No.: 13/606,383

(22) Filed: Sep. 7, 2012

(65) Prior Publication Data

US 2013/0058433 A1 Mar. 7, 2013

(30) Foreign Application Priority Data

Sep. 7, 2011 (CN) .......................... 2011 1 0263416

(51) Int. Cl.
*H04B 15/00* (2006.01)
*H04L 25/03* (2006.01)

(52) U.S. Cl.
CPC .............................. *H04L 25/03343* (2013.01)
USPC ........... 375/285; 375/232; 375/296; 375/349; 375/350

(58) Field of Classification Search
CPC . H04B 7/024; H04B 7/0413; H04L 25/03343
USPC .................. 375/229–236, 259–285, 295–352
See application file for complete search history.

(56) References Cited

U.S. PATENT DOCUMENTS 7,944,906 B2 * 5/2011 Xu et al. ........................ 370/349
8,379,705 B2 * 2/2013 Mallik et al. .................. 375/226
2009/0323849 A1 * 12/2009 Bala et al. ...................... 375/267
2010/0035555 A1 * 2/2010 Bala et al. ...................... 455/63.1
2010/0232528 A1 * 9/2010 Li et al. .......................... 375/260
2010/0239036 A1 * 9/2010 Koo et al. ...................... 375/260
2010/0304773 A1 * 12/2010 Ramprashad ................. 455/509
2011/0009140 A1 * 1/2011 Hwang et al. ................. 455/509
2011/0194540 A1 * 8/2011 Baligh et al. .................. 370/337
2011/0195678 A1 * 8/2011 Luo et al. ................... 455/114.3
2011/0206106 A1 * 8/2011 Mallik et al. .................. 375/226

(Continued)

OTHER PUBLICATIONS

"Downlink Interference Alignment", C. Suh, et al., GlobeCOM 2010, 5 pages.

(Continued)

*Primary Examiner* — Sam K Ahn
*Assistant Examiner* — James M Perez
(74) *Attorney, Agent, or Firm* — Harness, Dickey & Pierce, PLC

(57) ABSTRACT

The transmitter and a mobile terminal based on interference alignment use pre-coding and pre-decoding methods. An antenna mapping matrix is computed according to a downlink channel state information, wherein the antenna mapping matrix is used for antenna mapping for the current transmitter to perform interference alignment. A multi-cell pre-coding matrix according to the downlink channel state information and the antenna mapping matrix; a single cell multi-user pre-coding matrix and pre-coding user data using the single cell multi-user pre-coding matrix and the multi-cell pre-decoding matrix and performing an antenna mapping using the antenna mapping matrix are computed. A system which cannot use the interference alignment method directly may be transformed to use the interference alignment method directly. In addition, the interference suppression between cells and the interference management inside cells are two separate processes, in which different linear pre-coding and decoding methods may be used.

16 Claims, 5 Drawing Sheets

(56) References Cited

U.S. PATENT DOCUMENTS

| | | | |
|---|---|---|---|
| 2011/0211485 A1* | 9/2011 | Xu et al. | 370/252 |
| 2011/0319118 A1* | 12/2011 | Yu et al. | 455/522 |
| 2012/0020319 A1* | 1/2012 | Song et al. | 370/330 |
| 2012/0044978 A1* | 2/2012 | Wang et al. | 375/219 |
| 2012/0046033 A1* | 2/2012 | Ko et al. | 455/435.1 |
| 2012/0051459 A1* | 3/2012 | Liu | 375/296 |
| 2012/0077485 A1* | 3/2012 | Shin et al. | 455/422.1 |
| 2012/0087423 A1* | 4/2012 | Ko et al. | 375/259 |
| 2012/0099470 A1* | 4/2012 | Li et al. | 370/252 |
| 2012/0113897 A1* | 5/2012 | Thiele et al. | 370/328 |
| 2012/0122502 A1* | 5/2012 | Shin et al. | 455/501 |
| 2012/0281780 A1* | 11/2012 | Huang et al. | 375/267 |
| 2013/0279422 A1* | 10/2013 | Kim et al. | 370/328 |
| 2013/0301746 A1* | 11/2013 | Mobasher et al. | 375/267 |

OTHER PUBLICATIONS

"On the Design of Interference Alignment Scheme for Two-Cell MIMO Interfering Broadcast Channels", W. Shin, et al., IEEE Trans on Wireless Comm. 2011, pp. 437-442.

* cited by examiner

2

PRE-CODING METHOD, PRE-DECODING METHOD, TRANSMITTER AND MOBILE TERMINAL BASED ON INTERFERENCE ALIGNMENT

BACKGROUND OF THE INVENTION

1. Field of the Invention

The present invention relates to a multi-cell coordinated communication technology in a wireless communication system, and more particularly to a pre-coding method, a pre-decoding method, a transmitter and a mobile terminal in the multi-cell coordinated communication system using an interference alignment scheme.

2. Description of the Prior Art

In a wireless mobile cellular network, if neighboring cells work at the same frequency range, user terminals at the border of a cell will be strongly interfered by the neighboring cells. This kind of interference is called co-channel interference. This kind of co-channel interference may influence the communication quality, such as the transmission data-rate and reliability, of user terminals at the border of the cell.

In the solution of a traditional communication system such as Global System for Mobile Communication (GSM), a frequency-division multiplexing is adopted, i.e. neighboring cells use different sub-bands for transmission. Thus, the interference between neighboring cells may be avoided. However, resources for transmitting useful signals are reduced and therefore frequency spectrum utilization efficiency is reduced. For example, according to new cellular system such as Long Term Evolution (LTE) network, different cells in the entire network or in part of the network all work at a same frequency band while the interference is suppressed by a co-channel interference management method so as to improve the communication quality.

Recently, interference alignment methods have been proposed. According to this method, not only the interference between cells is suppressed, but also more resources are reserved for transmitting useful signals. Based on these advantages, a more spectrum-efficient wireless transmission may be obtained by using the interference alignment method. A basic idea of the interference alignment is to divide a signal space into a desired signal sub-space and an interference signal sub-space and then to have all interference signals into the interference signal sub-space so as to effectively suppress the interference between cells.

Non-patent document 1 (C. Suh et. al., "Downlink Interference Alignment" GlobeCOM 2010) and Non-patent document 2 (W. Shin et. al. "On the Design of Interference Alignment Scheme for Two-Cell MIMO Interfering Broadcast Channels" IEEE Trans. on Wireless Comm. 2011) propose two multi-cell multi-user linear pre-coding and pre-decoding methods based on the interference alignment. However, researches on the interference alignment are focused on theoretical phase and not in practice.

SUMMARY OF THE INVENTION

An object of the present invention is to provide a pre-coding method, a pre-decoding method, a transmitter and a mobile terminal in a multi-cell coordinated communication system based on an interference alignment scheme.

According to a first aspect of an embodiment of the invention, a pre-coding method based on an interference alignment scheme is provided. The method comprises steps of: computing an antenna mapping matrix using the downlink channel state information matrices of the channels between the transmitter and the terminals within the cell covered by the transmitter, wherein the antenna mapping matrix is used for antenna mapping for the current transmitter so as to perform an interference alignment scheme; computing a multi-cell pre-coding matrix for the transmitter and a multi-cell decoding matrix for each terminal within the coordinating cell using the downlink channel state information matrices of the channels between the transmitter and the terminals within the coordinating cell and using the antenna mapping matrix; computing a single cell multi-user pre-coding matrix for the current transmitter using the downlink channel state information matrices of the channels between the transmitter and the terminals within the cell covered by the transmitter, the antenna mapping matrix, the multi-cell pre-decoding matrix, and the multi-cell decoding matrices for the terminals within the cell covered by the current transmitter, the multi-cell decoding matrices are received from the transmitter of the coordinating cell; and pre-coding user data using the single cell multi-user pre-coding matrix and the multi-cell pre-decoding matrix and performing an antenna mapping for the pre-coded user data using the antenna mapping matrix.

According to a second aspect of an embodiment of the invention, a transmitter is provided. The transmitter comprises: an antenna mapping matrix computing unit, for computing an antenna mapping matrix using the downlink channel state information matrices of the channels between the transmitter and the terminals within the cell covered by the transmitter, wherein the antenna mapping matrix is used for antenna mapping for the current transmitter so as to perform an interference alignment scheme; a multi-cell pre-coding matrix computing unit, for computing a multi-cell pre-coding matrix for the transmitter and a multi-cell decoding matrix for each terminal within the coordinating cell using the downlink channel state information matrices of the channels between the transmitter and the terminals within the coordinating cell and using the antenna mapping matrix; a single cell multi-user pre-coding matrix computing unit, for computing a single cell multi-user pre-coding matrix for the current transmitter using the downlink channel state information matrices of the channels between the transmitter and the terminals within the cell covered by the transmitter, the antenna mapping matrix, the multi-cell pre-decoding matrix, and the multi-cell decoding matrices for the terminals within the cell covered by the current transmitter, the multi-cell decoding matrices are received from the transmitter of the coordinating cell; and a pre-coding unit, for pre-coding user data using the single cell multi-user pre-coding matrix and the multi-cell pre-decoding matrix and performing an antenna mapping for the pre-coded user data using the antenna mapping matrix.

According to a third aspect of an embodiment of the invention, a pre-decoding method based on an interference alignment scheme is provided. The method comprises steps of: receiving a multi-cell decoding matrix from the transmitter of the serving cell by a mobile terminal; decoding a downlink user data using the multi-cell decoding matrix; estimating a single cell multi-user equivalent channel using a downlink signal from the transmitter and the multi-cell decoding matrix obtained from the previous step, and computing a single cell multi-user decoding matrix according to the resultant single cell multi-user equivalent channel; and detecting downlink data using the single cell multi-user decoding matrix obtained from the previous step.

According to a fourth aspect of an embodiment of the invention, a mobile terminal is provided. The mobile terminal comprises: a multi-cell decoding unit, for receiving a multi-cell decoding matrix from the transmitter of the serving cell by a mobile terminal and decoding a downlink user data using the multi-cell decoding matrix; a channel estimation unit, for estimating a single cell multi-user equivalent channel using a downlink signal from the transmitter and the multi-cell decoding matrix obtained from the previous step, and computing a single cell multi-user decoding matrix according to the resultant single cell multi-user equivalent channel; and a multi-user decoding unit, for and detecting downlink data using the single cell multi-user decoding matrix obtained from the previous step.

According to embodiments of the invention, a specified system may be transformed into an equivalent system which may use an interference alignment scheme by antenna mapping, i.e., a system which cannot use the interference alignment scheme directly may be transformed into a system which can use the interference alignment scheme directly.

In addition, the interference suppression between cells and the interference management inside cells are two separate processes, in which different linear pre-coding and pre-decoding methods may be used. Therefore, a variety of implementing schemes may be obtained and different schemes have different performances and complexities, which are suitable for different communication environments.

BRIEF DESCRIPTION OF THE DRAWINGS

Advantages and features of the invention will become apparent with reference to accompanied drawings.

DETAILED DESCRIPTION OF THE PREFERRED EMBODIMENTS

Figure 1:
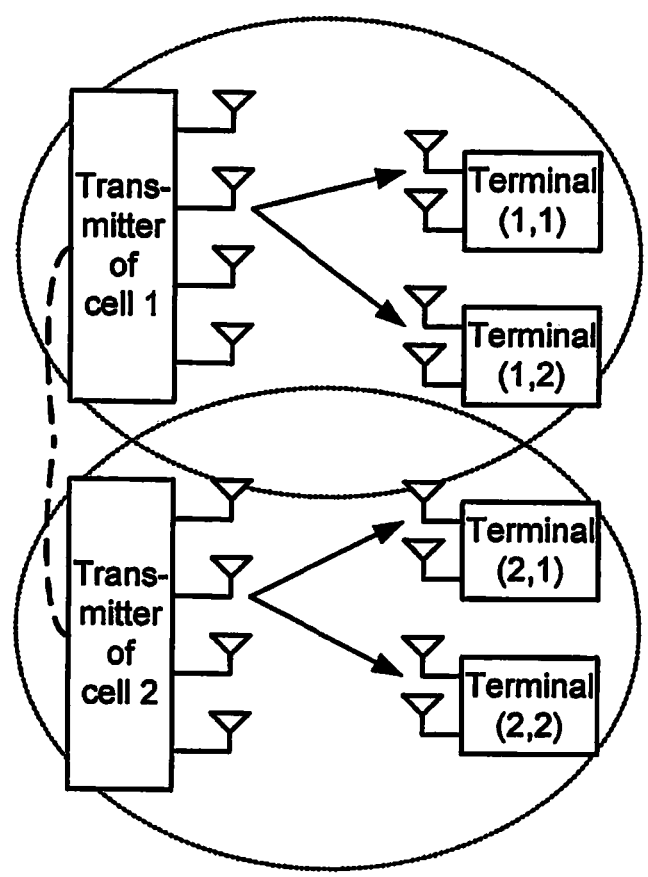
FIG. 1 shows a scenario in which a method according to an embodiment of the invention may be applied.

Embodiments of the invention will be described in detail with reference to accompanied drawings. In different figures, same reference numerals represent same or similar components. For the sake of clarity and simplicity, description on known functions and structures will be omitted so as not to obscure the subject of the invention.

FIG. 1 shows a scenario in which a method according to an embodiment of the invention may be applied. As shown in FIG. 1, two transmitters of two neighboring cells (a transmitter of cell 1 and a transmitter of cell 2) work at a same frequency range and they are connected by cable (connection shown by a dashed line) so as to perform limited information exchange. This information exchange is limited to system status information or control information but without user data, i.e., data transmitted to users are only stored locally in the transmitter of the cell in which the user terminal locates. As known to those skilled in the art, the cell corresponding to the transmitter may be an area covered by a single base station or a sector covered by a certain transmitter of the base station.

Each transmitter serves multiple users in the cell. For example, the transmitter in cell 1 serves terminal (1, 1) and terminal (1, 2) and the transmitter in cell 2 serves terminal (2, 1) and terminal (2, 2). Since the two cells work at the same frequency range, the co-channel interference may occur in the neighboring cell 1 and cell 2. The transmitter in cell 1 and the transmitter in cell 2 work together to suppress the co-channel interference between cells by the limited signaling exchange. Since there is cooperation (coordination) between cells and at the same time each cell serves multiple users, the system is called as a multi-cell multi-user system.

The method according to an embodiment of the invention relates to a multi-cell coordinating communication system based on a multi-antenna linear pre-coding and/or decoding, in which pre-coding matrices and decoding matrices are obtained based on an interference alignment scheme.

Figure 2:
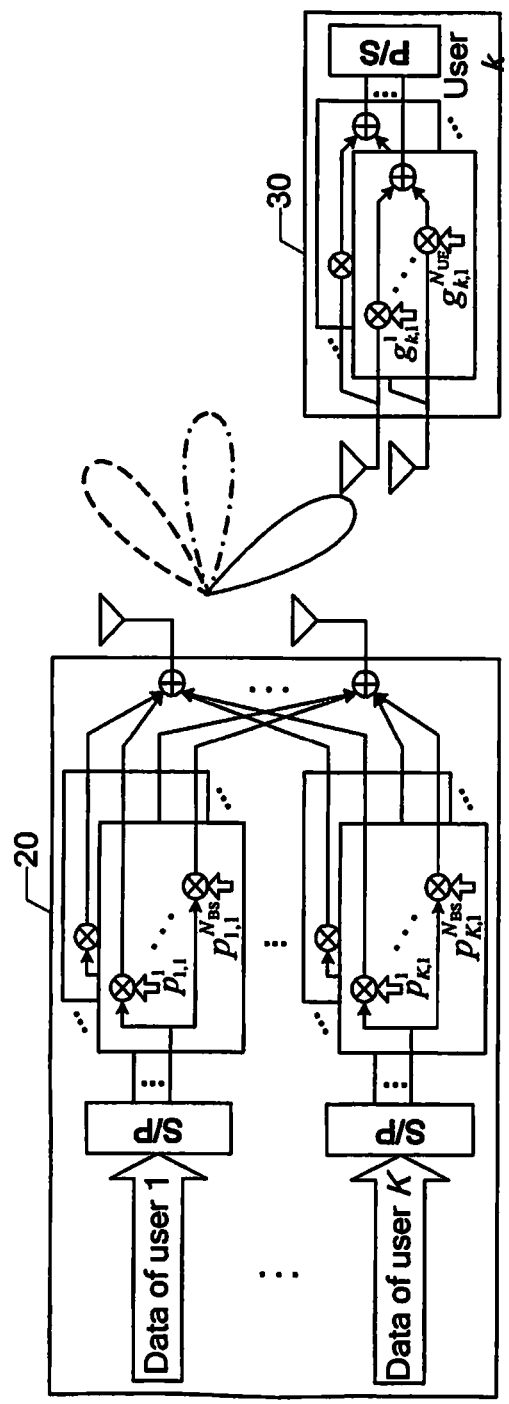
FIG. 2 is a schematic diagram showing a transmitter and a mobile terminal based on a pre-coding and pre-decoding method.

FIG. 2 is a schematic diagram showing a transmitter and a mobile terminal based on a pre-coding and pre-decoding method. As shown in FIG. 2, at the transmitter, data of user 1 and data of user 2 are weighted-added and then mapped to a transmitting antenna array. A matrix (or vector) constituted by weight coefficients at the transmitter is called a pre-coding matrix (or vector). At the receiver, for example for user k, signals received at different antennas are weighted-overlapped to obtain a useful signal. A matrix (or vector) constituted by weighted coefficients at the receiver is called as a decoding matrix (or vector).

According to an embodiment of the invention, a higher frequency spectrum utilization efficiency of the multi-cell coordinating communication system can be obtained by optimizing the pre-coding matrix (or vector) and the decoding matrix (or vector) so as to ensure a high quality data transmission of the user.

An input and output relation of the multi-cell multi-user downlink MIMO system adopting the linear pre-coding and decoding method may be represented by the following formula.

$$\hat{s}_{i,k} = G_{i,k}^{DL} y_{i,k} = \qquad (1)$$

$$G_{i,k}^{DL}\left[H_{i,i,k}^{DL}\left(P_{i,k}^{DL}s_{i,k} + \sum_{l \neq k} P_{i,l}^{DL}s_{i,l}\right) + \sum_{j \neq i} H_{j,i,k}^{DL}\left(\sum_{l} P_{j,l}^{DL}s_{j,l}\right) + v_{i,k}\right]$$

where $H_{i,i,k}^{DL}$ is a downlink channel matrix between transmitter i and user terminal k in cell i; $H_{j,i,k}^{DL}$ is a downlink channel matrix between transmitter j and user terminal k in cell i; $s_{i,k}$ is a data signal transmitted to user terminal k in cell i; $s_{i,l}$ is a data signal transmitted to user terminal l in cell i; $s_{j,l}$ is a data signal transmitted to user terminal l in cell j; $\hat{s}_{i,k}$ is a useful signal recovered at the receiver; $p_{i,j}^{DL}$ is a pre-coding matrix for pre-coding for user l in cell i; $P_{i,k}^{DL}$ is a pre-coding matrix for pre-coding for user k in cell i; $P_{j,l}^{DL}$ is a pre-coding matrix for pre-coding for user l in cell j; $G_{i,k}^{DL}$ is a decoding matrix for decoding data for user k in cell i; $v_{i,k}$ is a noise (including interference from non-coordinating cells) received by user terminal k in cell i.

Likely, An input and output relation of the multi-cell multi-user uplink MIMO system adopting the linear pre-coding and decoding method may be represented by the following formula.

$$\hat{s}_{i,k} = G_{i,k}^{UL} y_{i,k} \qquad (2)$$

$$= G_{i,k}^{UL}\left[\left(H_{i,i,k}^{UL} P_{i,k}^{UL} s_{i,k} + \sum_{l \neq k} H_{i,i,l}^{UL} P_{i,l}^{UL} s_{i,l}\right) + \left(\sum_{j \neq i} \sum_{l} H_{i,j,l}^{UL} P_{j,l}^{UL} s_{j,l}\right) + v_i\right]$$

where $H_{i,j,l}^{UL}$ is a uplink channel matrix between transmitter i and user terminal l in cell j; $H_{i,i,k}^{UL}$ is a uplink channel matrix between transmitter i and user terminal k in cell i; $H_{i,i,l}^{UL}$ is a uplink channel matrix between transmitter i and user terminal l in cell i; $s_{i,k}$ is a data signal transmitted to user terminal k in cell i; $s_{i,l}$ is a data signal transmitted to user terminal l in cell i; $s_{i,j}$ is a data signal transmitted to user terminal l in cell j; $\hat{s}_{i,k}$ is a useful signal of user k in cell i recovered at the receiver; $p_{i,j}^{UL}$ is a pre-coding matrix for pre-coding for user l in cell i; $P_{i,k}^{UL}$ is a pre-coding matrix for pre-coding for user k in cell i; $P_{j,l}^{UL}$ is a pre-coding matrix for pre-coding for user l in cell j; $G_{i,k}^{UL}$ is a decoding matrix for decoding data for user k in cell i; $v_i$ is a noise (including interference from non-coordinating cells) received by transmitter i.

A computing process of the downlink pre-coding and decoding matrices in the multi-cell multi-user system according to an embodiment of the invention will be described in detail.

Figure 3:
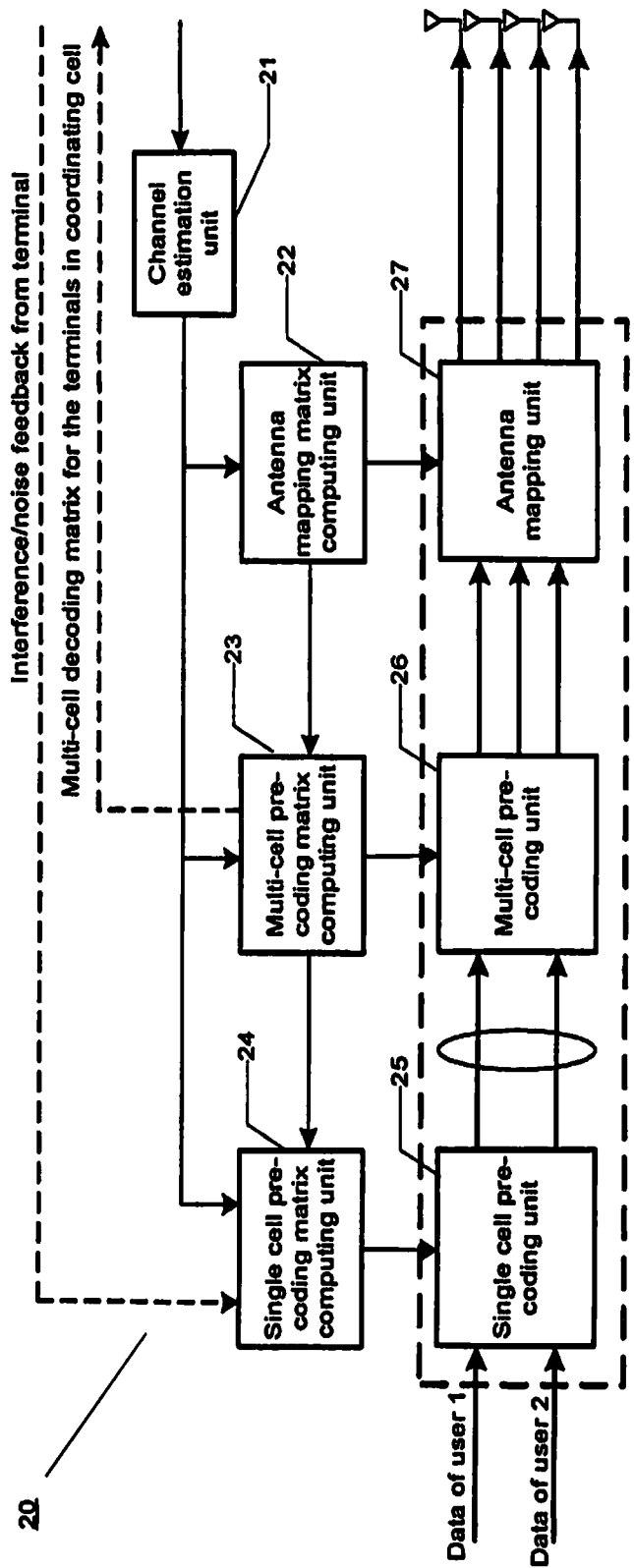
FIG. 3 is block diagram showing a structure of a transmitter according to an embodiment of the invention.

FIG. 3 is block diagram showing a structure of a transmitter according to an embodiment of the invention. As shown in FIG. 3, a transmitter 20 comprises a channel estimation unit 21. The channel estimation unit 21 is configured for:

performing a channel estimation on an uplink detecting signal received for a TDD (time division duplexing) system to obtain an uplink channel state information matrix of the channel between the transmitter 20 and each terminal within the cell covered by the transmitter 20 and an uplink channel state information matrix of the channel between the transmitter 20 and each terminal within the range of the coordinating cell; obtaining a downlink channel state information matrix of the channel between transmitter 20 and a terminal within a cell covered by the transmitter 20 and a downlink channel state information matrix of the channel between the transmitter 20 and each terminal within the range of the coordinating cell according to a reciprocity property between uplink and downlink channels of the TDD system;

obtaining a downlink channel state information matrix of the channel between the transmitter 20 and each terminal within a cell covered by the transmitter 20 and a downlink channel state information matrix of the channel between the transmitter 20 and each terminal within the range of the coordinating cell according to information fed back by the receiver for an FDD (frequency division duplexing) system.

The transmitter 20 further comprises an antenna mapping matrix computing unit 22, which is configured for computing an antenna mapping matrix based on the downlink channel state information matrices of the channels between the transmitter 20 and the terminals within the cell covered by the transmitter 20. The transmitter 20 further comprises a multi-cell pre-coding matrix computing unit 23, which is configured for computing a multi-cell pre-coding matrix for the transmitter 20 and a multi-cell decoding matrix for each terminal within a coordinating cell using the downlink channel state information matrices of the channels between the transmitter 20 and the terminals within the range of the coordinating cell and using the antenna mapping matrix.

The transmitter 20 further comprises a single cell multi-user pre-coding matrix computing unit 24, which is configured for computing an equivalent single cell multi-user channel matrix and thus a single cell multi-user pre-coding matrix for the transmitter 20 according to the downlink channel state information matrices of the channels between the transmitter 20 and the terminals within a cell covered by the transmitter 20, the antenna mapping matrix of the transmitter 20 and the multi-cell pre-coding matrix as well as the multi-cell decoding matrices for the terminals of the current transmitter 20, the multi-cell decoding matrices are received from the transmitter of the coordinating cell.

According to an embodiment of the invention, the single cell multi-user pre-coding matrix computing unit 24 computes the single cell multi-user pre-coding matrix according to the equivalent single cell multi-user channel matrix and a noise power measurement value received from the terminal within the cell covered by the transmitter 20.

The transmitter 20 further comprises a single cell pre-coding unit 25, which is configured for performing a single cell pre-coding by using the single cell multi-user pre-coding matrix, i.e. for performing a linear overlapping of data of multiple users in the cell.

The transmitter 20 further comprises a multi-cell pre-coding unit 26, which is configured for performing a multi-cell pre-coding on the data after the single cell pre-coding by using the multi-cell pre-coding matrix so as to realize the interference suppression between cells.

The transmitter 20 further comprises an antenna mapping unit 27, which is configured for mapping the linear overlapped user data after the multi-cell pre-coding to a transmitting antenna array.

Although the above units 25, 26 and 27 are described in separate units, those skilled in the art may realize that these units may be combined into one unit or divided into more units to realize the pre-coding.

Figure 4:
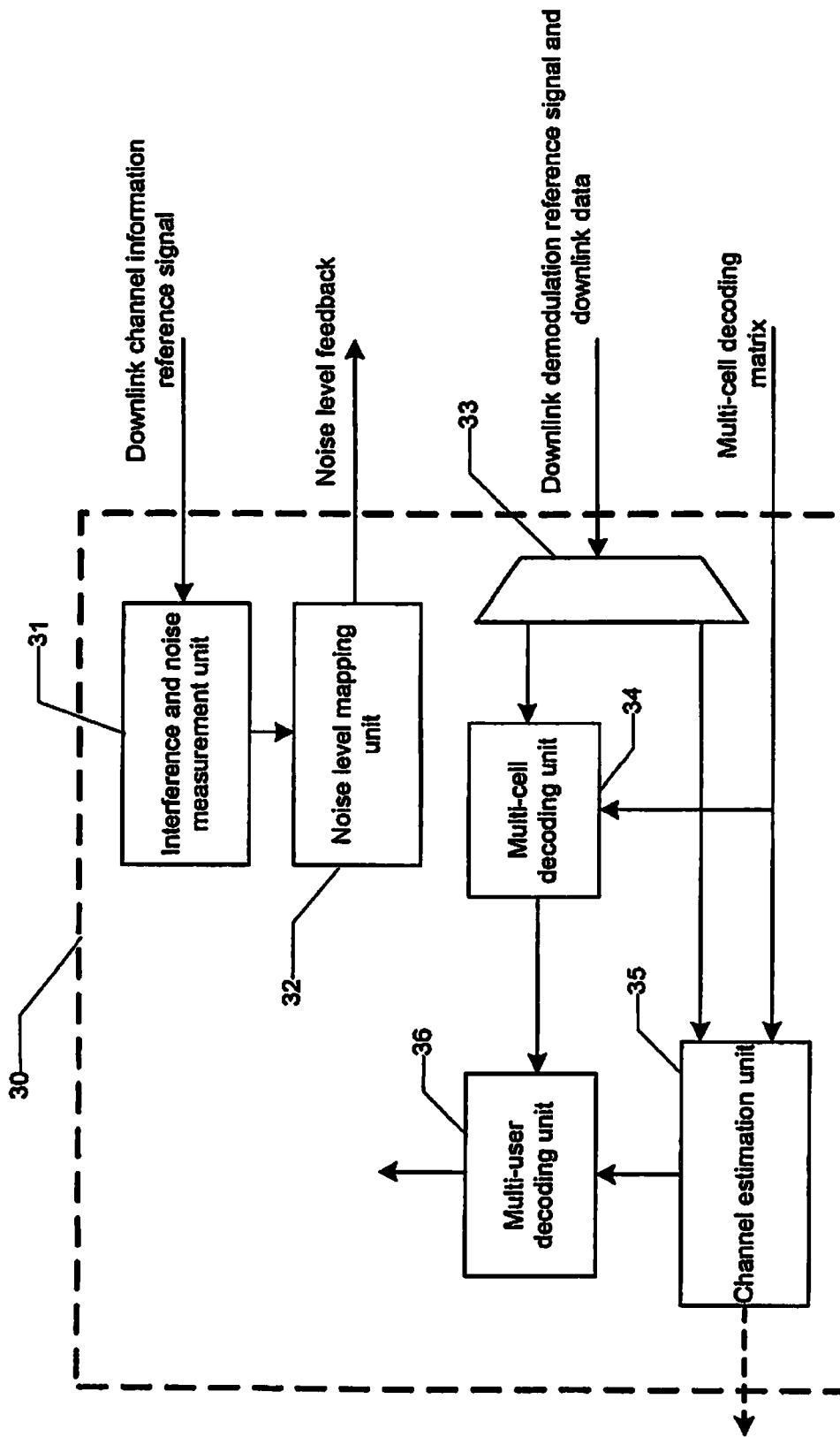
FIG. 4 is a block diagram showing a structure of a mobile terminal according to an embodiment of the invention.

FIG. 4 is a block diagram showing a structure of a mobile terminal according to an embodiment of the invention. As shown in FIG. 4, an interference and noise measurement unit 31 at one side of the mobile terminal 30 measures an interference and noise value using the downlink reference signals and inputs the interference and noise value to a noise level mapping unit 32. The noise level mapping unit 32 maps the interference and noise value to a corresponding noise level and feeds it back to the transmitter 20.

On one hand, after the mobile terminal 30 receives a downlink signal, for example a downlink demodulated reference signal and downlink data, a decomposing unit 33 decomposes the downlink demodulated reference signal and the downlink data and then a channel estimation unit 35 performs a channel estimation based on the downlink signal to obtain a downlink channel matrix. On the other hand, after a multi-cell decoding unit 34 receives from the transmitter in its own cell the multi-cell decoding matrix transmitted from the transmitter in the coordinating cell, it decodes the downlink user data by using the multi-cell decoding matrix so as to eliminate the interference between cells. In addition, the channel estimation unit 35 estimates the single cell multi-user equivalent channel according to the multi-cell decoding matrix and the downlink signal and computes the single cell multi-user decoding matrix according to the single cell multi-user equivalent channel. Then, a multi-user decoding unit 36 performs a MIMO detection on the downlink data by using the single cell multi-user decoding matrix and then outputs a data flow.

According to an embodiment of the invention, a specified system may be transformed into an equivalent system which may use the interference alignment method by antenna mapping, i.e., a system which cannot use the interference alignment method directly may be transformed into a system which can use the interference alignment method directly. In addition, the interference suppression between cells and the interference management inside cells are two separate processes, in which different linear pre-coding and decoding methods may be used. Therefore, a lot of implementing schemes may be obtained and different schemes have different performances and complexities, which are suitable for different communication environments.

An operation process of respective units of the transmitter 20 and the mobile terminal 30 will be described in detail with reference to specific examples. According to an embodiment of the invention, the antenna mapping matrix computing unit 22 computes the antenna mapping matrix and the antenna mapping unit 27 transforms the specified system into a system which may use the interference alignment scheme by using the antenna mapping matrix.

Assuming that the number of the antennas at the transmitter in the specified system is $N_{BS}$ and the number of the antennas at the terminal side in the specified system is $N_{UE}$. An antenna configuration for the system which may use the interference alignment method should satisfy the following conditions: the number of the antennas at the transmitter in the specified system is larger than or equal to the number of the antennas at the transmitter in the equivalent system while the number of the antennas at the terminal side in the specified system is equal to the number of the antennas at the terminal side in the equivalent system, i.e. $N_{BS} \geq N'_{BS}$ and $N_{UE} = N'_{UE}$, in which $N'_{BS}$ represents the number of the antennas at the transmitter in the equivalent system and $N'_{UE}$ represents the number of the antennas at the terminal side in the equivalent system. Taking the system shown in FIG. 1 as an example, $N_{BS}=4$ and $N_{UE}=2$ and therefore the antenna configuration for the system which may use the interference alignment method is $N'_{BS}=3$ and $N'_{UE}=2$.

The system is transformed by a linear mapping, i.e. by finding a $N'_{NS} \times N_{BS}$ antenna mapping matrix. Therefore, when performing the antenna mapping, the $N_{BS}$ data flows are linearly pre-coded using the antenna mapping matrix. Taking the system shown in FIG. 1 as an example, the antenna mapping matrix should be a 3*4 matrix. $P_{pre\_AM}^1$ is used to represent the antenna mapping matrix of the transmitter in cell 1.

According to an embodiment of the invention, a $N'_{BS} \times N_{BS}$ matrix may be generated randomly as the antenna mapping matrix $P_{pre\_AM}^1$. $P_{pre\_AM}^1$ is only used for antenna mapping and any $N'_{BS} \times N_{BS}$ matrix may also realize antenna mapping. It is less complex and more convenient to randomly generate the antenna mapping matrix.

Alternatively, according to another embodiment, the singular value decomposition may be performed on the equivalent channel matrix H constituted by the downlink channel matrix between the transmitter i and terminal k (k=1, 2, ..., K) in the cell.

$$H = \begin{bmatrix} H_{i,i,1} \\ \vdots \\ H_{i,i,K} \end{bmatrix} \quad (3)$$

$H = USV^H$ (superscript $^H$ represents a conjugate transpose operation); in which $H_{i,j,1}$ is the downlink channel between transmitter i and user terminal 1 in cell i; $H_{i,i,K}$ is the downlink channel between transmitter i and user terminal K in cell i; a column vector of the unitary matrix U constitutes a left singular value vector, a column vector of the unitary matrix V constitutes a right singular value vector, diagonal values of the diagonal matrix S are singular values. $N'_{BS}$ columns are selected from the unitary matrix V and the $N'_{BS}$ columns correspond to $N'_{BS}$ maximum singular values. The antenna mapping matrix $P_{pre\_AM}^1$ according to the embodiment is constituted by the $N'_{BS}$ column vectors. Similarly, the antenna mapping matrix $P_{pre\_AM}^2$ of the transmitter in cell 2 may also be obtained.

According to an embodiment of the invention, the multi-cell pre-coding for a transmitter should be designed together with the multi-cell decoding for the user terminals within the coordinating cell and the principle for the design is interference alignment. Operations of the multi-cell pre-coding matrix computing unit 23 are described with reference to an example (taking the transmitter in cell 1 in FIG. 1 as an example).

The equivalent interference channel matrix and the decoding matrices for two terminals in cell 2 are obtained by constituting a linear equation using the downlink channel matrices of the channels between transmitter 1 and the two terminals within cell 2 and the antenna mapping matrix $P_{pre\_AM}^1$ of cell 1. The multi-cell pre-coding matrix is computed according to the orthogonality between the equivalent interference channel matrix and the multi-cell pre-coding matrix. For example, the following linear equation is constituted by the downlink channel matrices and the antenna mapping matrix $P_{pre\_AM}^1$.

$$\begin{bmatrix} I_{3\times3} & -(H_{1,2,1} P_{pre\_AM}^1)^H & 0_{3\times2} \\ I_{3\times3} & 0_{3\times2} & -(H_{1,2,2} P_{pre\_AM}^1)^H \end{bmatrix} \begin{bmatrix} h_{IA}^1 \\ g_{2,1}^H \\ g_{2,2}^H \end{bmatrix} = 0_{6\times1} \quad (4)$$

where $H_{1,2,1}$ is the downlink channel between the transmitter of cell 1 to terminal 1 (i.e. terminal (2, 1)) of cell 2; $H_{1,2,2}$ is the downlink channel between the transmitter of cell 1 and terminal 2 (i.e. terminal (2, 2)) of cell 2; $P_{pre\_AM}^1$ is the antenna mapping matrix of the transmitter of cell 1; $h_{IA}^1$ is the equivalent interference channel matrix of the transmitter in cell 1; $g_{2,1}$ is the multi-cell decoding matrix for terminal (2, 1); $g_{2,2}$ is the multi-cell decoding matrix for terminal (2, 2); $I_{3\times3}$ is a unit diagonal matrix having 3 lines and 3 columns; $0_{3\times2}$ is an all zero matrix having 3 lines and 2 columns; $0_{6\times1}$ is an all zero column vector having 6 lines and 1 column.

The decoding matrices $g_{2,1}$ and $g_{2,2}$ may be obtained by solving equation (4) and these two decoding matrices are the decoding matrices for the two users (i.e. terminal (2, 1) and terminal (2, 2)) in cell 2.

The equivalent interference channel matrix channel $h_{IA}^1$ is obtained by solving equation (4) and the following equation is obtained:

$$h_{IA}^1 P_{pre\_IA}^1 = 0 \quad (5)$$

where $P_{pre\_IA}^1$ is the multi-cell pre-coding matrix of the transmitter in cell 1 and is obtained by solving equation (5).

The above equation (4) is equal to the following equation:

$$g_{2,1} H_{1,2,1} P_{pre\_AM}^1 = g_{2,2} H_{1,2,2} P_{pre\_AM}^1 = h_{IA}^{1H} \quad (6)$$

where $h_{IA}^{1H}$ represents the conjugate transpose of $h_{IA}^1$ and definitions of other variables are similar to those in equation (4).

According to equation (6), interference signals from the transmitter of cell 1 to two terminals in cell 2 are aligned to the same direction, i.e. the direction indicated by vector $h_{IA}^1$. If the direction in which the transmitter of cell 1 transmitting data to a terminal in cell 1 is orthogonal to the direction indicated by vector $h_{IA}^1$, no interference signal from the transmitter of cell 1 to terminals in cell 2 will be produced. Equation (5) is defined for this orthogonality. Combining equation (4) and (5), the interference between cells may be eliminated.

At the same time, since interference signals are substantially aligned to the same direction, more directions for useful signals may be left.

$P_{pre\_IA}^2$, $g_{1,1}$ and $g_{1,2}$ may be obtained by a same operation at the transmitter of cell 2, i.e. the multi-cell pre-coding matrix of cell 2, the multi-cell decoding matrix for terminal (1, 1) and the multi-cell decoding matrix for terminal (1, 2) may be obtained.

For example, the equivalent interference channel matrix and the decoding matrices for two terminals in cell 1 are obtained by constituting a linear equation using the downlink channel matrices of the channels between transmitter 1 and the two terminals within cell 2 and the antenna mapping matrix $P_{pre\_IA}^2$ of the transmitter of cell 2. The multi-cell pre-coding matrix is computed according to the orthogonality between the equivalent interference channel matrix and the multi-cell pre-coding matrix. For example, the following linear equation is constituted by the downlink channel matrices and the antenna mapping matrix $P_{pre\_AM}^2$.

$$\begin{bmatrix} I_{3\times3} & -(H_{2,1,1}P_{pre\_AM}^2)^H & 0_{3\times 2} \\ I_{3\times3} & 0_{3\times 2} & -(H_{2,1,2}P_{pre\_AM}^2)^H \end{bmatrix} \begin{bmatrix} h_{IA}^2 \\ g_{1,1}^H \\ g_{1,2}^H \end{bmatrix} = 0_{6\times1} \quad (4')$$

where $H_{2,1,1}$ is the downlink channel from the transmitter of cell 2 to terminal 1 (i.e., terminal (1, 1)) within cell 1; $H_{2,1,2}$ is the downlink channel from the transmitter of cell 2 to terminal 2 (i.e., terminal (1, 2)) within cell 1; $P_{pre\_AM}^2$ is the antenna mapping matrix of the transmitter of cell 2; $h_{IA}^2$ is the equivalent interference channel matrix of the transmitter in cell 2; $g_{1,1}$ is the multi-cell decoding matrix for terminal (1, 1); $g_{1,2}$ is the multi-cell decoding matrix for terminal (1, 2); $I_{3\times3}$ is a unit diagonal matrix having 3 lines and 3 columns; $0_{3\times2}$ is an all zero matrix having 3 lines and 2 columns; $0_{6\times1}$ is an all zero column vector having 6 lines and 1 column.

The decoding matrices $g_{1,1}$ and $g_{1,2}$ may be obtained by solving equation (4') and these two decoding matrices are the decoding matrices for the two terminals (i.e. terminal (1, 1) and terminal (1, 2)) in cell 1.

The equivalent interference channel matrix $h_{IA}^2$ is obtained by solving equation (4') and the following equation is obtained:

$$h_{IA}^2 P_{pre\_IA}^2 = 0 \quad (5')$$

where $P_{pre\_IA}^2$ is the multi-cell pre-coding matrix of the transmitter in cell 2 and is obtained by solving equation (5').

The above equation (4') is equal to the following equation:

$$g_{1,1}H_{2,1,1}P_{pre\_AM}^2 = g_{1,2}H_{2,1,2}P_{pre\_AM}^2 = h_{IA}^{2H} \quad (6')$$

where $h_{IA}^{2H}$ represents the conjugate transpose of $h_{IA}^2$ and definitions of other variables are similar to those in equation (4').

According to equation (6'), interference signals from the transmitter of cell 2 to two terminals in cell 1 are aligned to the same direction, i.e. the direction indicated by vector $h_{IA}^2$. If the direction in which the transmitter of cell 2 transmitting data to a terminal in cell 2 is orthogonal to the direction indicated by vector $h_{IA}^2$, no interference signal from the transmitter of cell 2 to terminals in cell 1 will be produced. Equation (5') is defined for this orthogonality. Combining equation (4') and (5'), the interference between cells may be eliminated. At the same time, since interference signals are substantially aligned to the same direction, more directions for useful signals may be left.

According to an embodiment of the invention, an operation of the single cell multi-user pre-coding matrix computing unit 24 may be described with reference to the following example (taking the transmitter of cell 1 as an example).

A equivalent multi-user multi-antenna system matrix is constituted by the downlink channel matrices between the transmitter in cell 1 and the terminal (1,1) and (1, 2), the resultant antenna mapping matrix $P_{pre\_AM}^1$ of the transmitter in cell 1, the multi-cell pre-coding matrix $P_{pre\_IA}^1$ and the decoding matrices $g_{1,1}$ and $g_{1,2}$ of the terminal (1,1) and (1, 2) in cell 1.

$$H_{MU}^1 = \begin{bmatrix} h_{MU,1}^1 \\ h_{MU,2}^1 \end{bmatrix} = \begin{bmatrix} g_{1,1}H_{1,1,1}P_{pre\_AM}^1 P_{pre\_IA}^1 \\ g_{1,2}H_{1,1,2}P_{pre\_AM}^1 P_{pre\_IA}^1 \end{bmatrix} \quad (7)$$

$$v_{MU}^1 = \begin{bmatrix} v_{MU,1}^1 \\ v_{MU,2}^1 \end{bmatrix} = \begin{bmatrix} g_{1,1}v_{1,1} \\ g_{1,2}v_{1,2} \end{bmatrix}$$

where $H_{MU}^1$ is the equivalent single cell multi-user channel matrix of cell 1; $h_{MU,1}^1$ is the equivalent channel matrix corresponding to the terminal (1, 1) in cell 1; $h_{MU,2}^1$ is the equivalent channel matrix corresponding to the terminal (1, 2) in cell 1; $v_{MU}^1$ is the equivalent noise vector; $v_i$ is the equivalent noise of the terminal (1, 1); $v_{MU,2}^1$ is the equivalent noise of the terminal (1, 2); $H_{1,1,1}$ is the downlink channel matrix from the transmitter of cell 1 to the terminal (1, 1) in cell 1; $H_{1,1,2}$ is the downlink channel matrix from the transmitter of cell 1 to the terminal (1, 2) in cell 1; $v_{1,k}$ (k=1 or 2) is a noise received by terminal k in cell 1.

According to the matrix computed by equation (7), the following input and output relation of an equivalent multi-user system may be obtained:

$$\hat{s}_{1,k} = g_{MU,k}^{1,DL}\left[\left(h_{MU,k}^1 P_{MU,k}^{1,DL} s_{1,k} + h_{MU,k}^1 \sum_{l\neq k} P_{MU,l}^{1,DL} s_{1,l}\right) + v_{MU,k}^1\right] \quad (8)$$

where $P_{MU,k}^{1,DL}$ is the multi-user pre-coding matrix of terminal k in cell 1; $g_{MU,k}^{1,DL}$ is the multi-user MIMO decoding matrix of terminal k in cell 1; $h_{MU,k}^1$ is the multi-user channel matrix for terminal k in cell 1; $P_{MU,l}^{1,DL}$ is the multi-user pre-coding matrix of terminal l in cell 1; $s_{1,l}$ is the data signal of the user terminal l in cell 1; $s_{1,k}$ is the data signal of the user terminal k in cell 1; $v_{MU,k}^1$ is the equivalent noise of the terminal k in cell 1.

According to different principles, $P_{MU,k}^{1,DL}$ and $g_{MU,k}^{1,DL}$ may be computed for the multi-user MIMO linear pre-coding and decoding.

Methods for computing the linear pre-coding and decoding matrices comprise but are not limited to: non-iterative algorithms such as Zero Forcing (ZF) algorithm, Minimum Mean Square Error (MMSE) algorithm, Matching Filtering (MF) algorithm, Block Diagonalization (BD) algorithm and Maximum Signal to Leakage and Noise Ratio (SLNR) algorithm, and iterative algorithms such as Maximum Sum Rate Iterative algorithm and Minimum Mean Square Error (MMSE) Iterative algorithm. The Minimum Mean Square Error (MMSE) algorithm, Maximum Signal to Leakage and Noise Ratio (SLNR) algorithm, Maximum Sum Rate Iterative algorithm and Minimum Mean Square Error (MMSE) Iterative algorithm need to use the equivalent interference and noise measurement values fed from the terminals. The Zero Forcing (ZF) algorithm, Matching Filtering (MF) algorithm and Block Diagonalization (BD) algorithm need not to use the equivalent interference and noise measurement values fed from the terminals.

Taking the transmitter of cell 2 as an example, an equivalent multi-user multi-antenna system matrix is constituted by the downlink channel matrices between the transmitter in cell 2 and the terminals (2, 1) and (2, 2), the antenna mapping matrix $P_{pre\_AM}^2$ of the transmitter in cell 2, the multi-cell pre-coding matrix $P_{pre\_IA}^2$ and the decoding matrices $g_{2,1}$ and $g_{2,2}$ of the terminal (2, 1) and (2, 2) in cell 2.

$$H_{MU}^2 = \begin{bmatrix} h_{MU,1}^2 \\ h_{MU,2}^2 \end{bmatrix} = \begin{bmatrix} g_{2,1} H_{2,2,1} P_{pre\_AM}^2 P_{pre\_IA}^2 \\ g_{2,2} H_{2,2,2} P_{pre\_AM}^2 P_{pre\_IA}^2 \end{bmatrix} \quad (7')$$

$$v_{MU}^2 = \begin{bmatrix} v_{MU,1}^2 \\ v_{MU,2}^2 \end{bmatrix} = \begin{bmatrix} g_{2,1} v_{2,1} \\ g_{2,2} v_{2,2} \end{bmatrix}$$

where $H_{MU}^2$ is the equivalent single cell multi-user channel matrix of cell 2; $h_{MU,1}^2$ is the equivalent channel matrix corresponding to the terminal (2, 1) in cell 2; $h_{MU,2}^2$ is the equivalent channel matrix corresponding to the terminal (2, 2) in cell 2; $v_{MU,2}^2$ is the equivalent noise vector; $v_{MU,1}^2$ is the equivalent noise of the terminal (2, 1); $v_{MU,2}^2$ is the equivalent noise of the terminal (2, 2); $H_{2,2,1}$ is the downlink channel matrix from the transmitter of cell 2 to the terminal (2, 1) in cell $H_{2,2,2}$ is the downlink channel matrix from the transmitter of cell 2 to the terminal (2, 2) in cell 2; $v_{2,k}$ (k=1 or 2) is a noise received by terminal k in cell 2.

According to the matrix computed by equation (7'), the following input and output relation of an equivalent multi-user system may be obtained:

$$\hat{s}_{2,k} = g_{MU,k}^{2,DL} \left[ \left( h_{MU,k}^2 P_{MU,k}^{2,DL} s_{2,k} + h_{MU,k}^2 \sum_{l \neq k} P_{MU,l}^{2,DL} s_{2,l} \right) + v_{MU,k}^2 \right] \quad (8')$$

where $P_{MU,k}^{2,DL}$ is the multi-user pre-coding matrix of terminal k in cell $g_{MU,k}^{2,DL}$ is the multi-user MIMO decoding matrix of terminal k in cell 2; $h_{MU,k}^2$ is the multi-user channel matrix for terminal k in cell 2; $P_{MU,l}^{2,DL}$ is the multi-user pre-coding matrix of terminal l in cell 2; $s_{2,l}$ is the data signal of the user terminal l in cell 2; $s_{2,k}$ is the data signal of the user terminal k in cell 2; $v_{MU,k}^2$ is the equivalent noise of the terminal k in cell 2.

According to different principles, $P_{MU,k}^{2,DL}$ and $g_{MU,k}^{2,DL}$ may be computed for the multi-user MIMO linear pre-coding and decoding.

Methods for computing the linear pre-coding and decoding matrices comprise but are not limited to: non-iterative algorithms such as Zero Forcing (ZF) algorithm, Minimum Mean Square Error (MMSE) algorithm, Matching Filtering (MF) algorithm, Block Diagonalization (BD) algorithm and Maximum Signal to Leakage and Noise Ratio (SLNR) algorithm, and iterative algorithms such as Maximum Sum Rate Iterative algorithm and Minimum Mean Square Error (MMSE) Iterative algorithm. The Minimum Mean Square Error (MMSE) algorithm, Maximum Signal to Leakage and Noise Ratio (SLNR) algorithm, Maximum Sum Rate Iterative algorithm and Minimum Mean Square Error (MMSE) Iterative algorithm need to use the equivalent interference and noise measurement value fed from the terminal. The Zero Forcing (ZF) algorithm, Matching Filtering (MF) algorithm and Block Diagonalization (BD) algorithm need not to use the equivalent interference and noise measurement value fed from the terminal.

Figure 5:
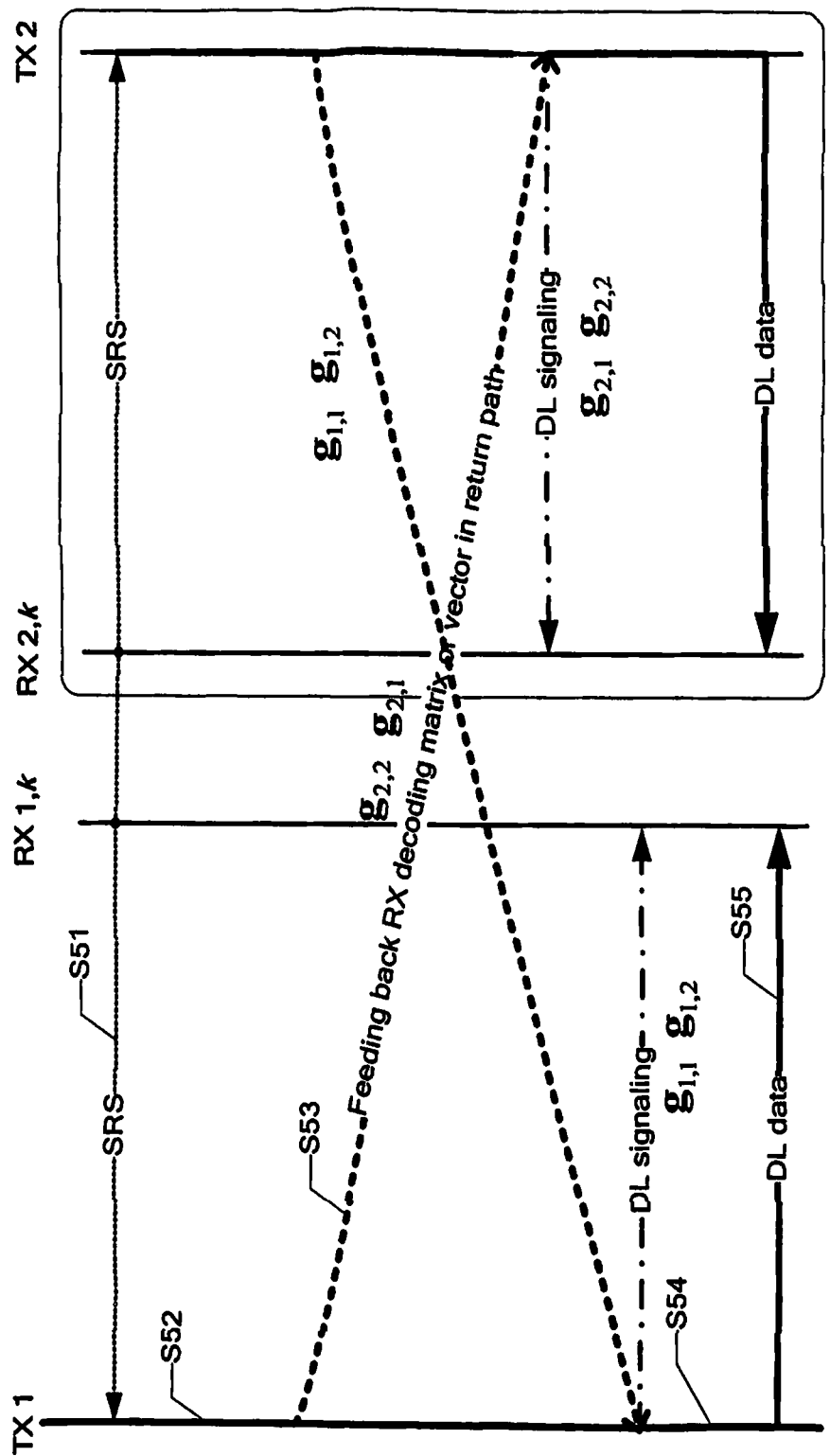
FIG. 5 is a flow chart showing the pre-coding and pre-decoding method based on an interference alignment scheme according to an embodiment of the invention.

FIG. 5 is a flow chart showing a coordinating communication method based on the interference alignment according to an embodiment of the invention.

For simplicity, assuming k in FIG. 5 is 1 or 2. Therefore, cell 1 and cell 2 are coordinating cells, transmitter (TX1) of cell 1 transmits data to terminal (1, 1) and (1, 2), i.e. RX1,1 and RX1,2, transmitter (TX2) of cell 2 transmits data to terminal (2, 1) and (2, 2), i.e. RX2,1 and RX2,2. The description with reference to FIG. 5 is for the TDD system. However, those skilled in the art may understand that the invention may also be used in the FDD system. The method according to an embodiment of the invention comprises the following steps.

In step S51, the terminal (1, 1) transmits uplink detecting signals SRS to the transmitter of cell 1 and the transmitter of cell 2. The transmitter of cell 1 and the transmitter of cell 2 receive the uplink detecting signal SRS respectively and the channel estimation unit 21 of the two transmitters perform the channel estimation to obtain the uplink channels of the terminal (1, 1). The transmitter of cell 1 and the transmitter of cell 2 obtain the downlink channels of the terminal (1, 1) according to a reciprocity property between uplink and downlink channels of the TDD system. The terminals (1, 2), (2, 1) and (2, 2) perform similar operations and the transmitter of cell 1 and the transmitter of cell 2 obtain the downlink channel matrices of the terminals.

Optionally, the terminal (1, 1) may measure an intensity of the interference from the non-coordinating cells and the noise signals and then feed the intensity of the interference and noise signals back to the transmitter of cell 1 and the transmitter of cell 2 by sending a feed-back signal. Next, the transmitter of cell 1 and the transmitter of cell 2 receive the feed-back signal from the terminal (1, 1) and obtain the intensity of the interference from non-cooperating cells and noise signals received by the terminal (1, 1), i.e., the equivalent interference and noise measurement value of terminal (1, 1). (Terminals (1, 2), (2, 1) and (2, 2) perform similar operations and the transmitter of cell 1 and the transmitter of cell 2 receive the intensity of the interference from the coordinating cells and noise signals received by these terminals, i.e., the equivalent interference and noise measurement value of terminal (1, 2), (2, 1) and (2, 2). The interference and noise measurement values obtained may be used in the computation for the multi-user pre-coding matrix and the multi-user pre-decoding matrix.

In step S52, the antenna mapping matrix computing unit 22 of the transmitter of cell 1 computes the antenna mapping matrix according to the information of the downlink channel between the transmitter of cell 1 and the terminals (1, 1) and (1, 2). According to the above formulae (4) and (5), the multi-cell pre-coding matrix computing unit 23 of the transmitter of cell 1 computes the multi-cell decoding matrices for the terminals (2, 1) and (2, 2) and the multi-cell pre-coding matrix of the transmitter of cell 1 according to the information of the downlink channel between the transmitter of cell 1 and the terminals (2, 1) and (2, 2) in the coordinating cell and according to the antenna mapping matrix of the transmitter of cell 1. For example, the decoding matrices of the two terminals in cell 2 and the equivalent interference channel matrix are obtained by constituting a linear equation using the downlink channel matrices between the transmitter of cell 1 and the terminals of the cell 2 and the antenna mapping matrix of the transmitter of cell 1. Then, the multi-cell pre-coding matrix of the transmitter of cell 1 may be computed according to the orthogonality between the equivalent interference channel matrix and the multi-cell pre-coding matrix.

As shown in FIG. 5, the transmitter of cell 1 notifies cell 2 the multi-cell decoding matrices of the terminals (2, 1) and (2, 2) through the cable connection. In step S53, the decoding matrices $g_{2,1}$ and $g_{2,2}$ are transmitted to the transmitter of cell 2 through a backhaul link between the transmitter of cell 1 and the transmitter of cell 2 and then the transmitter of cell 2 transmits the decoding matrices to the terminals (2, 1) and (2, 2) through the downlink (DL) signaling.

Similarly, the antenna mapping matrix computing unit 22 of the transmitter of cell 2 computes the antenna mapping matrix according to the information of the downlink channel between the transmitter of cell 2 and the terminals (2, 1) and (2, 2). The multi-cell pre-coding matrix computing unit 23 of the transmitter of cell 2 computes the multi-cell decoding matrices for the terminals (1, 1) and (1, 2) and the multi-cell pre-coding matrix of the transmitter of cell 2 according to the information of the downlink channel between the transmitter of cell 2 and the terminals (2, 1) and (2, 2) in the coordinating cell 1 and according to the antenna mapping matrix of the transmitter of cell 2. For example, the decoding matrices of the two terminals in cell 1 and the equivalent interference channel matrix are obtained by constituting a linear equation using the channel matrix between the transmitter of cell 2 and the terminals of cell 1 and the antenna mapping matrix of the transmitter of cell 2. Then, the multi-cell pre-coding matrix of the transmitter of cell 2 may be computed according to the orthogonality between the equivalent interference channel matrix and the multi-cell pre-coding matrix. The single cell multi-user pre-coding matrix computing unit 24 computes the equivalent single cell multi-user channel matrix of cell 2 and thus the single cell multi-user pre-coding matrix of cell 2 according to the downlink channel matrices of the channels between the transmitter of cell 2 and terminals (2, 1) and (2, 2), the antenna mapping matrix of the transmitter of cell 2, the multi-cell pre-decoding matrix of cell 2 and the multi-cell decoding matrices for terminals (2, 1) and (2, 2). According to another embodiment of the invention, the single cell multi-user pre-coding matrix of cell 1 may be computed according to the equivalent single cell multi-user channel matrix and the equivalent interference and noise measurement values received by the terminals (2, 1) and (2, 2).

The transmitter of cell 2 notifies the terminals (2, 1) and (2, 2) of their multi-cell decoding matrices respectively through the down link. The transmitter of cell 2 performs the single cell multi-user pre-coding, multi-cell pre-coding and antenna mapping on the data and/or demodulated reference signal of the terminals (2, 1) and (2, 2) and finally sends the result to the user terminal through the down link.

In step S54, the single cell multi-user pre-coding matrix computing unit 24 of the transmitter of cell 1 computes the equivalent single cell multi-user channel matrix and thus the single cell multi-user pre-coding matrix of cell 1 according to the downlink channel matrices of the channels between the transmitter of cell 1 and terminals (1, 1) and (1, 2), the antenna mapping matrix of the transmitter of cell 1, the multi-cell pre-decoding matrix of cell 1 and the multi-cell decoding matrices for terminals (1, 1) and (1, 2). According to another embodiment of the invention, the single cell multi-user pre-coding matrix of cell 1 may be computed according to the equivalent single cell multi-user channel matrix and the equivalent interference and noise measurement values received by the terminals (1, 1) and (1, 2).

In step S55, the single cell multi-user pre-coding unit 25, the multi-cell pre-coding unit 26 and the antenna mapping unit 27 of cell 1 perform the single cell multi-user pre-coding, multi-cell pre-coding and antenna mapping on the data and/or demodulated reference signal of the terminals (1, 1) and (1, 2) and finally transmit to the user terminal through the down link.

The transmitter of cell 2 notifies the transmitter of cell 1 of the multi-cell decoding matrices of the terminals (1, 1) and (1, 2) through the cable connection. The transmitter of cell 1 transmits multi-cell decoding matrices to the terminals (1, 1) and (1, 2) through the down link.

Each terminal recovers useful signals according to the received multi-cell decoding matrix. The multi-cell decoding unit of each terminal decodes the downlink user data by using the received multi-cell decoding matrix to eliminate the interference between cells. The channel estimation unit of each terminal estimates the single cell multi-user equivalent channel according to the multi-cell decoding matrix and the downlink signal and finally computes the single cell multi-user decoding matrix according to the single cell multi-user equivalent channel. Then the multi-user decoding unit of each terminal recovers useful signals according to the single cell multi-user decoding matrix and detects the downlink data.

Although explanatory embodiments have been shown and described, it would be appreciated by those skilled in the art that changes, alternatives, and modifications all falling into the scope of the claims and their equivalents may be made in the embodiments without departing from spirit and principles of the disclosure and the scope of the invention is specified in the claims.

What is claimed is:

1. A pre-coding method using an interference alignment scheme, the method comprising:
computing an antenna mapping matrix using downlink channel state information matrices of channels between a current transmitter and terminals within a cell covered by the current transmitter, wherein the antenna mapping matrix is used for antenna mapping for the current transmitter so as to perform an interference alignment scheme;
computing a multi-cell pre-coding matrix for the current transmitter and a multi-cell decoding matrix for each of a plurality of terminals within a coordinating cell using the downlink channel state information matrices of the channels between the current transmitter and the terminals within the coordinating cell and using the antenna mapping matrix;
computing a single cell multi-user pre-coding matrix for the current transmitter using the downlink channel state information matrices of the channels between the current transmitter and the terminals within the cell covered by the current transmitter, the antenna mapping matrix, a multi-cell pre-decoding matrix, and the multi-cell decoding matrices for the terminals within the cell covered by the current transmitter, wherein the multi-cell decoding matrices are received from a transmitter of the coordinating cell; and
pre-coding user data using the single cell multi-user pre-coding matrix and the multi-cell pre-decoding matrix, and performing an antenna mapping for the pre-coded user data using the antenna mapping matrix.

2. The method according to claim 1, further comprising:
transmitting the multi-cell decoding matrices for the terminals within the coordinating cell to the transmitter of the coordinating cell by the current transmitter.

3. The method according to claim 1, wherein the step of computing the antenna mapping matrix further comprises:
performing a singular value decomposition on a downlink channel matrix H and obtaining $USV^H$, selecting from the unitary matrix V a number of columns which is equal to the number of antennas at a transmitter in an equivalent system to constitute the antenna mapping matrix, in which a column vector of the unitary matrix U constitutes a left singular value vector, a column vector of the unitary matrix V constitutes a right singular value vector, diagonal values of the diagonal matrix S are singular values and superscript$^H$ represents a conjugate transpose operation on a matrix.

4. The method according to claim 1, wherein the step of computing the antenna mapping matrix is realized by generating a $N'_{BS} \times N_{BS}$ antenna mapping matrix randomly, wherein $N'_{BS}$ represents the number of antennas at a transmitter in an equivalent system and $N_{BS}$ represents the number of antennas at the current transmitter.

5. The method according to claim 1, wherein the step of computing the multi-cell pre-coding matrix of the current transmitter further comprises:
computing an equivalent interference channel matrix by constituting a linear equation using the downlink channel state information matrices of the channels between the current transmitter and the terminals within the coordinating cell and the antenna mapping matrix; and
computing the multi-cell pre-coding matrix based on the equivalent interference channel matrix.

6. The method according to claim 1, wherein the step of computing the single cell multi-user pre-coding matrix of the current transmitter further comprises:
constituting an equivalent multi-user multi-antenna system by using the downlink channel state information matrices of the channels between the current transmitter and the terminals within the cell covered by the current transmitter, the antenna mapping matrix, the multi-cell pre-coding matrix and the multi-cell decoding matrices of the terminals within the cell covered by the current transmitter; and
computing a linear pre-coding matrix for the current transmitter and the decoding matrices for the terminals within the cell covered by the current transmitter by using a multi-user pre-coding algorithm and a multi-user decoding algorithm based on the equivalent multi-user multi-antenna system.

7. The method according to claim 1, wherein the step of computing the single cell multi-user pre-coding matrix of the current transmitter further comprises:
constituting an equivalent multi-user multi-antenna system by using the downlink channel state information matrices of the channels between the current transmitter and the terminals within the cell covered by the current transmitter, the antenna mapping matrix, the multi-cell pre-coding matrix, and the multi-cell decoding matrices of the terminals within the cell covered by the current transmitter; and
computing a linear pre-coding matrix for the current transmitter and the decoding matrices for the terminals within the cell covered by the current transmitter by using a multi-user pre-coding algorithm and a multi-user decoding algorithm based on the equivalent multi-user multi-antenna system and a noise power measurement value received from the terminals within the cell covered by the current transmitter.

8. A transmitter, comprising:
an antenna mapping matrix computing unit, configured to compute an antenna mapping matrix using downlink channel state information matrices of channels between a current transmitter and terminals within a cell covered by the current transmitter, wherein the antenna mapping matrix is used for antenna mapping for the transmitter so as to perform an interference alignment scheme;
a multi-cell pre-coding matrix computing unit, configured to compute a multi-cell pre-coding matrix for the current transmitter and a multi-cell decoding matrix for each of a plurality of terminals within a coordinating cell using the downlink channel state information matrices of the channels between the current transmitter and the terminals within the coordinating cell and using the antenna mapping matrix;
a single cell multi-user pre-coding matrix computing unit, configured to compute a single cell multi-user pre-coding matrix for the current transmitter using the downlink channel state information matrices of the channels between the current transmitter and the terminals within the cell covered by the current transmitter, the antenna mapping matrix, a multi-cell pre-decoding matrix, and the multi-cell decoding matrices for the terminals within the cell covered by the current transmitter, wherein the multi-cell decoding matrices are received from a transmitter of the coordinating cell; and
a pre-coding unit, configured to pre-code user data using the single cell multi-user pre-coding matrix and the multi-cell pre-decoding matrix, and perform an antenna mapping for the pre-coded user data using the antenna mapping matrix.

9. The transmitter according to claim 8, wherein the current transmitter transmits the multi-cell decoding matrices for the terminals within the coordinating cell to the transmitter of the coordinating cell.

10. The transmitter according to claim 8, wherein the antenna mapping matrix computing unit further comprising logic that performs a singular value decomposition on a downlink channel matrix H and obtains $USV^H$, selects from the unitary matrix V a number of columns which is equal to the number of antennas at a transmitter in an equivalent system to constitute the antenna mapping matrix, in which a column vector of the unitary matrix U constitutes a left singular value vector, a column vector of the unitary matrix V constitutes a right singular value vector, diagonal values of the diagonal matrix S are singular values and superscript$^H$ represents a conjugate transpose operation on a matrix.

11. The transmitter according to claim 8, wherein the antenna mapping matrix computing unit further comprising logic that generates a $N'_{BS} \times N_{BS}$ antenna mapping matrix randomly, in which $N'_{BS}$ represents the number of antennas at a transmitter in an equivalent system and $N_{BS}$ represents the number of antennas at the current transmitter.

12. The transmitter according to claim 8, wherein the multi-cell pre-coding matrix computing unit further comprising logic that computes an equivalent interference channel matrix by constituting a linear equation using the downlink channel state information matrices of the channel between the current transmitter and the terminals within the coordinating cell and the antenna mapping matrix; and computes the multi-cell pre-coding matrix based on the equivalent interference channel matrix.

13. The transmitter according to claim 8, wherein the single cell multi-user pre-coding matrix computing unit further comprising logic that constitutes an equivalent multi-user multi-antenna system by using the downlink channel state information matrices of the channels between the current transmitter and the terminals within the cell covered by the current transmitter, the antenna mapping matrix, the multi-cell pre-coding matrix and the multi-cell decoding matrices of the terminals within the cell covered by the current transmitter; and computes a linear pre-coding matrix for the current transmitter and the decoding matrices for the terminal within the cell covered by the current transmitter by using a multi-user pre-coding algorithm and a multi-user decoding algorithm based on the equivalent multi-user multi-antenna system.

14. The transmitter according to claim 8, wherein the single cell multi-user pre-coding matrix computing unit further comprising logic that constitutes an equivalent multi-user multi-antenna system by using the downlink channel state information matrices of the channels between the current transmitter and the terminals within the communication cell covered by the current transmitter, the antenna mapping matrix, the multi-cell pre-coding matrix, and the multi-cell decoding matrices of the terminals within the cell covered by the current transmitter; and computes a linear pre-coding matrix for the current transmitter and the decoding matrices for the terminals within the cell covered by the current transmitter by using a multi-user pre-coding algorithm and a multi-user decoding algorithm based on the equivalent multi-user multi-antenna system and a noise power measurement value received from the terminals within the cell covered by the current transmitter.

15. A pre-decoding method based on an interference alignment scheme, the method comprising:

receiving a multi-cell decoding matrix from a transmitter of a serving cell by a mobile terminal;

decoding a downlink user data using the multi-cell decoding matrix;

estimating a single cell multi-user equivalent channel using a downlink signal from the transmitter and the multi-cell decoding matrix obtained from the previous step, and computing a single cell multi-user decoding matrix according to the resultant single cell multi-user equivalent channel; and detecting downlink data using the single cell multi-user decoding matrix obtained from the previous step.

16. A mobile terminal, comprising:

a multi-cell decoding unit, configured to receive a multi-cell decoding matrix from a transmitter of a serving cell and decode a downlink user data using the multi-cell decoding matrix;

a channel estimation unit, configured to estimate a single cell multi-user equivalent channel according to a downlink signal from the transmitter and the multi-cell decoding matrix obtained from the multi-cell decoding unit, and compute a single cell multi-user decoding matrix according to the resultant single cell multi-user equivalent channel; and a multi-user decoding unit, configured to detect downlink data according to the single cell multi-user decoding matrix obtained from the channel estimation unit.

* * * * *